United States Patent
Coatney

(10) Patent No.: US 7,984,328 B1
(45) Date of Patent: *Jul. 19, 2011

(54) SYSTEM AND METHOD FOR REDUCING UNRECOVERABLE MEDIA ERRORS

(75) Inventor: Douglas W. Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,568

(22) Filed: Dec. 18, 2009

Related U.S. Application Data

(63) Continuation of application No. 12/125,420, filed on May 22, 2008, now Pat. No. 7,661,020, which is a continuation of application No. 11/799,795, filed on May 3, 2007, now Pat. No. 7,447,938, which is a continuation of application No. 10/422,531, filed on Apr. 24, 2003, now Pat. No. 7,275,179.

(51) Int. Cl.
*G06F 11/00* (2006.01)

(52) U.S. Cl. .................................. 714/7; 714/8

(58) Field of Classification Search .................. 714/5, 6, 714/7, 8, 42, 770
See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A | 5/1980 | Patel | |
| 4,375,100 A | 2/1983 | Tsuji et al. | |
| 4,467,421 A | 8/1984 | White | |
| 4,517,663 A | 5/1985 | Imazeki et al. | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schilling et al. | |
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |

(Continued)

OTHER PUBLICATIONS

David Hitz et al. TR3002 File System Design for a NFS File Server Appliance published by Network Appliance, Inc.

(Continued)

*Primary Examiner* — Joshua A Lohn
(74) *Attorney, Agent, or Firm* — Cesari and McKenna, LLP

(57) ABSTRACT

A method for operating a computer data storage system is described. A recoverable error in a data storage device in recognized in response to receiving a command for a write operation. It is determined whether the data storage system is in a degraded state. The write operation encountering the recoverable error is reassigned to a space on a spare data storage device if the data storage system is not in a degraded state. The write operation is stored to reassign to a spare data storage device at a future time if the data storage system is in a degraded state.

19 Claims, 4 Drawing Sheets

U.S. PATENT DOCUMENTS

| | | | |
|---|---|---|---|
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,313,626 | A | 5/1994 | Jones et al. |
| 5,351,246 | A | 9/1994 | Blaum et al. |
| 5,355,453 | A | 10/1994 | Row et al. |
| 5,410,667 | A | 4/1995 | Belsan et al. |
| 5,485,579 | A | 1/1996 | Hitz et al. |
| 5,537,567 | A | 7/1996 | Galbraith et al. |
| 5,579,475 | A | 11/1996 | Blaum et al. |
| 5,623,595 | A | 4/1997 | Bailey |
| 5,802,366 | A | 9/1998 | Row et al. |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,918,001 | A | 6/1999 | Ueno et al. |
| 5,931,918 | A | 8/1999 | Row et al. |
| 5,941,972 | A | 8/1999 | Hoese et al. |
| 5,963,962 | A | 10/1999 | Hitz et al. |
| 5,974,544 | A | 10/1999 | Jeffries et al. |
| 6,038,570 | A | 3/2000 | Hitz et al. |
| 6,065,037 | A | 5/2000 | Hitz et al. |
| 6,092,215 | A | 7/2000 | Hodges et al. |
| 6,138,125 | A | 10/2000 | DeMoss |
| 6,138,201 | A | 10/2000 | Rebalski |
| 6,158,017 | A | 12/2000 | Han et al. |
| 6,223,300 | B1 | 4/2001 | Gotoh |
| 6,233,108 | B1 | 5/2001 | Inoue |
| 6,282,670 | B1 | 8/2001 | Islam et al. |
| 6,425,035 | B2 | 7/2002 | Hoese et al. |
| 6,434,711 | B1 | 8/2002 | Takiyanagi |
| 6,442,711 | B1 | 8/2002 | Sasamoto et al. |
| 6,532,548 | B1 | 3/2003 | Hughes |
| 6,581,185 | B1 | 6/2003 | Hughes |
| 6,854,071 | B2 | 2/2005 | King et al. |
| 6,950,966 | B2 | 9/2005 | Chiquoine et al. |
| 6,993,701 | B2 | 1/2006 | Corbett et al. |
| 7,055,057 | B2 | 5/2006 | Achiwa |
| 7,069,381 | B1 | 6/2006 | Kiselev et al. |
| 7,246,268 | B2 | 7/2007 | Craig et al. |
| 7,275,179 | B1 | 9/2007 | Coatney |
| 7,447,938 | B1 | 11/2008 | Coatney |
| 7,661,020 | B1 | 2/2010 | Coatney |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Anvin, Peter H, "The Mathematics of RAID 6," Dec. 2004.

Auspex 4Front NS2000, System Architecture, Network-Attached Storage for a New Millennium, Auspex Engineering Technical Report 24, Jan. 1999.

Bestavros, Azer, et al., Reliability and Performance of Parallel Disks, Technical Memorandum 45312-891206-01TM, AT&T, Bell Laboratories, Department 45312, Holmdel, NJ, Dec. 1989.

Bitton, Dina, Disk Shadowing, Proceedings of the 14th VLDB Conference, LA, CA (1988).

Bultman, David L., High Performance SCSI Using Parallel Drive Technology, In Proc. BUSCON Conf., pp. 40-44, Anaheim, CA, Feb. 1988.

Chen, Peter et al., Two Papers on RAIDs. Technical Report, CSD-88-479, Computer Science Division, Electrical Engineering and Computer Sciences, University of California at Berkeley (1988).

Chen, Peter M., et al., An Evaluation of Redundant Arrays of Disks Using an Amdahl 5890, Performance Evaluation, pp. 74-85, 1990—check to see if exact same copy as one in WAFL.

Chen, Peter M.., et al, Maximizing Performance in a Striped Disk Array, Proc. 1990 ACM SIGARCH 17th Intern. Symp. on Comp. Arch., Seattle, WA, May 1990, pp. 322-331.

Chen, Peter M., et al., RAID:High Performance, Reliable Secondary Storage, ACM Computing Surveys, 26(2):145-185, Jun. 1994.

Chervenak, Ann L., Performance Measurement of the First RAID Prototype, Technical Report UCB/CSD 90/574, Computer Science Division (EECS), University of California, Berkeley, May 1990.

Copeland, George, et al., "A Comparison of High-Availability Media Recovery techniques," in Proc. ACM-SIGMOD Int. Conf. Management of Data, 1989.

Courtright II, William V., et al., RAIDframe: A Rapid Prototyping Tool for RAID Systems, Computer Science Technical Report CMU-CS97-142, Carnegie Mellon University, Pittsburgh, PA 15213, Jun. 4, 1997.

Evans The Tip of the Iceberg:RAMAC Virtual Array—Part I, Technical Support, Mar. 1997, pp. 1-4.

Gibson, Garth A., et al., Coding Techniques for Handling Failures in Large Disk Arrays, Technical Report UCB/CSD 88/477, Computer Science Division, University of California, (Jul. 1988.).

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Goldick, Jonathan S., et al., Multi-resident AFS: An Adventure in Mass Storage, in Proceedings of the 1995 USENIX Technical Conference, pp. 47-58, Jan. 1995.

Graham, Susan L., et al., Massive Information Storage, Management, and Use, (NSF Institutional Infrastructure Proposal), Technical Report No. UCB/CSD 89/493, Jan. 1989.

Gray, Jim et al., Parity striping of disc arrays: Low-Cost Reliable Storage with Acceptable Throughput. In Proceedings of the 16th Very Large Data Bases Conference, pp. 148-161, Brisband, Australia, 1990.

Grimes, DW Martinez, Two Dimensional Parity Error Correction Procedure, IBM Technical Disclosure Bulletin 2686-2689, Oct. 1982.

Grimes, DW Martinez, Vertical Parity Generator for Two Dimensional Parity, IBM Technical Disclosure Bulletin 2682-2685, Oct. 1982.

Hellerstein, Lisa, et al,. Coding Techniques for Handling Failures in Large Disk Arrays. in Algorithmica vol. 2, Nr. 3, 182-208 (1994).

Hughes, James, et al., High Performance RAIT , Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, Tape Group Parity Protection, IEEE Symposium on Mass Storage, pp. 72-79, Mar. 1999.

Katz, Randy H. et al., Disk System Architectures for High Performance Computing, undated.

Kent, Jack et al., Optimizing Shadow Recovery Algorithms, IEEE Transactions on Software Engineering, 14(2):155-168, Feb. 1988.

Kim, Michelle Y., Synchronized Disk Interleaving, IEEE Transactions on Computers, C-35(11):978-988, Nov. 1986.

Kim, Michelle, et al., Asynchronous Disk Interleaving Approximating Access Delays, IEEE Transactions on Computers, vol. 40, No. 7, Jul. 1991 , pp. 801-810.

Lawlor, F. D., Efficient Mass Storage Parity Recovery Mechanism, IBM Technical Disclosure Bulletin 24(2):986-987, Jul. 1981.

Lee, Edward K., et al., RAID-II: A Scalable Storage Architecture for High-Bandwidth Network File Service, Technical Report UCB/CSD 92/672, (Feb. 1992).

Li, Don, et al., Authors' Reply, IEEE Transactions on Communications, 46:575, May 1998.

Livny, Miron, et al., Multi-Disk Management Algorithms, In Proceedings of the ACM International Conference on Measurement and Modeling of Computer Systems (SIGMETRICS), pp. 69-77, Banff, Alberta, Canada, May 1987.

Meador, Wes E., Disk Array Systems, Proceedings of COMPCON, 1989, pp. 143-146.

Ng, Spencer, et al., Trade-Offs Between Devices and Paths in Achieving Disk Interleaving, IEEE International Symposium on Computer Architecture, 1988, pp. 196-201.

Ng, Spencer, Some Design Issues of Disk Arrays, Proceedings of COMPCON Spring '89, pp. 137-142 IEEE, 1989.

Park, Arvin, et al., Providing Fault Tolerance in Parallel Secondary Storage Systems, Technical Report CS-TR-057-86, Princeton, Nov. 1986.

Patel, Arvind M., Adaptive Cross-Parity (AXP) Code for a High-Density Magnetic Tape Subsystem, IBM Technical Disclosure Bulletin 29(6):546-562, Nov. 1985.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture," catalogue, 1997.

Reddy, A. L. Narasimha, et al., An Evaluation of Multiple-Disk I/O Systems, IEEE Transactions on Computers, vol. 38, No. 12, Dec. 1989, pp. 1680-1690.

Schulze, Martin E., Considerations in the Design of a RAID Prototype, Computer Science Division, Department of Electrical Engineering and Computer Sciences, Univ. of CA, Berkley, Aug. 25, 1988.

Schulze, Martin., et al., How Reliable is a RAID?, Proceedings of COMPCON, 1989, pp. 118-123.

Shirriff, Kenneth W., Sawmill:A Logging File System for a High-Performance RAID Disk Array, CSD-95-862, Jan. 1995.

Stonebraker, Michael, et al., The Design of XPRS, Proceedings of the 14th VLDB Conference, LA, CA (1988).

Tanabe, Takaya, et al, Redundant Optical Storage System Using DVD-RAM Library, IEEE Symposium on Mass Storage, pp. 80-87, Mar. 1999.

Tekrom—"About RAID 6".

Tweten, David, Hiding Mass Storage Under UNIX: NASA's MSS-H Architecture, IEEE Symposium on Mass Storage, pp. 140-145, May 1990.

Wilkes, John, et al., The HP AutoRAID hierarchical storage system, ACM Transactions on Computer Systems, Feb. 1996, vol. 14, pp. 108-136.

SYSTEM AND METHOD FOR REDUCING UNRECOVERABLE MEDIA ERRORS

RELATED APPLICATIONS

This application is a continuation of U.S. Ser. No. 12/125,420, filed on May 22, 2008, now issued as U.S. Pat. No. 7,661,020 on Feb. 9, 2010, which is a continuation of U.S. Ser. No. 11/799,795, filed on May 3, 2007 by Douglas W. Coatney, now issued as U.S. Pat. No. 7,447,938, which is a continuation of U.S. Ser. No. 10/422,531, filed on Apr. 24, 2003, now issued as U.S. Pat. No. 7,275,179 on Sep. 25, 2007.

FIELD OF THE INVENTION

This invention relates to networked data storage systems, and more particularly to error recovery and prevention processes in disk arrays.

BACKGROUND OF THE INVENTION

A file server is a computer that provides file service relating to the organization of information on storage devices, such as disk drives ("disks"). The file server or filer includes a storage operating system that implements a file system to logically organize the is data on disk information as a hierarchical structure of directories and files. Each "on-disk" file may be implemented as a set of data structures, e.g., disk blocks, configured to store information. A directory, on the other hand, may be implemented as a specially formatted file in which information about other files and directories are stored.

A type of file system is a write-anywhere file system that does not overwrite data on disks. If a data block on disk is retrieved (read) from disk into memory and "dirtied" with new data, the data block is stored (written) to a new location on disk to thereby optimize write performance. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a storage system that manages data access and may, in the case of filers, implement file system semantics. In this sense, Data ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The storage devices in a file server environment are typically disk drives organized as a disk array, wherein each disk is a self-contained rotating magnetic media stores age device. A disk is typically a collection of platters, rotatable on a spindle, with each platter surface divided into concentric tracks, and each track divided into sectors. The sector is the smallest unit that can be individually accessed for input/output (I/O) operations, e.g., read or written. The term disk in this context is synonymous with a hard disk drive (HDD), a direct access storage device (DASD) or a logical unit number (lun) in a storage device. Unless the context indicates otherwise, the term "disk" as used herein is intended to embrace not only magnetic storage devices, but also optical, solid state and other types of storage devices. The term "sector" as used herein is intended to embrace the smallest unit of storage on the storage media that can be individually read or written, and may also be generally referred to by other names (e.g. block) depending on the media type. For clarity, it should be noted that storage operating systems may manage blocks as the smallest unit of storage, for example, each capable of storing 4 kilobytes of data, while the disk itself manages sectors, for example, each capable of storing 512 bytes or 520 bytes of data, depending on the type of drive. The storage operating system maintains a map of data blocks to disk sectors.

The storage operating system typically organizes data storage as one or more storage "volumes" that comprise physical storage disks, defining an overall logical arrangement of storage space. The disks within a volume are typically organized as one or more groups of Redundant Array of Independent (or Inexpensive) Disks (RAID). RAID implementations enhance the reliability/integrity of data storage through the redundant writing of data "stripes" across blocks of a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

In the operation of a disk array, it is fairly common that a disk will fail. A goal of a high performance storage system is to make the mean time to data loss (MTTDL) as long as possible, preferably much longer than the expected service life of the storage system. Data can be lost when one or more storage devices fail, making it impossible to recover data from the device. Typical schemes employed by storage systems to avoid loss of data include mirroring, backup and parity protection. Minoring is an expensive solution in terms of consumption of storage resources, such as hard disk drives. Backup does not protect recently modified data. Parity schemes as used in RAID systems are common because they provide a redundant encoding of the data that allows for data recovery, typically, despite a failure of one of the disks in the array, at an overhead cost of just one additional disk in each array of the system.

Specifically, the redundant information provided by parity protection is computed as the exclusive-OR (XOR), i.e., the sum over one-bit fields, of the data on all disks. As referenced above, the disks are typically divided into parity groups, each of which comprises one or more data disks and a parity disk. The disk space is divided into stripes, with each stripe containing one block from each disk. Typically, the blocks of a stripe are at the same location on each disk in the parity group. Within a stripe, all but one block are data blocks and one block is a parity block, computed by the XOR of all the data.

If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. If one disk fails in the parity group, the contents of that disk can be reconstructed on a second "spare" disk or disks by adding all the contents of the remaining data blocks and subtracting the result from the parity block. Since two's compliment addition and subtraction over one-bit fields are both equivalent to XOR operations, this reconstruction consists of the XOR of all the surviving data and parity blocks. Similarly, if the parity disk is lost, it can be recomputed in the same way from the surviving data.

As noted above, typically RAID implementations permit data recovery through reconstruction of the data from the remaining disks of an array following the failure of a is single disk in the array. In the event of a second disk failure in the array prior to reconstruction of the data from the first failure, RAID systems typically cannot recover the data. This is called a "double-disk panic." In such an event, the system would have to recover the data from a minor or backup, if available.

Far more likely than a second disk drive failing in a RAID group (before reconstruction has been completed for a previous disk failure) is the possibility that there may be an unknown bad sector (media error) on an otherwise intact disk. For example, a media error can result from a flaw in the surface of the magnetic disk, a condition often caused by a head crash or misalignment (e.g., due to overheating). A disk typically detects a media error when it attempts to respond to a disk access request from the storage operating system, e.g., during a read operation. In the event the read operation fails, the disk will normally attempt to recover the data from the sector involved using internal (to the disk) error recovery mechanisms. These can include retrying the read operation pursuant to a predetermined retry algorithm, repositioning the read/write head, and error detection and correction (EDC) algorithms (also referred to sometimes as error correction code (ECC)). Unfortunately, such internal error recovery mechanisms typically adversely impact disk read performance. If such internal error recovery mechanisms succeed in enabling the disk to respond successfully to the read request, a condition sometimes called "self-recovery," the error is termed a "recovered error." On the other hand, if such internal error recovery mechanisms fail to enable the drive to respond successfully to the read request, the error is termed an "non-recoverable error." Non-recoverable errors are typically noted by the storage operating system, which may then resort to RAID parity in an attempt to recalculate the lost data. However, if a bad block is encountered while the RAID group is in degraded mode (after a disk failure but before reconstruction has completed), then that block's data cannot be recovered by the filer without the aid of a backup or other external error recovery mechanism, if available.

To protect against this scenario, filers routinely verify all data stored in the file system using RAID "scrubbing." The scrubbing operation may be scheduled to occur at regular intervals (for example, once per week, early on Sunday morning). However, automatic scrubbing is optional and can be suppressed. During this process, filer self-generates I/O operations to read all data blocks from RAID groups that have no failed drives. If the disk encounters a problem in reading a sector during scrubbing operations, it will use self-recovery operations in a further attempt at obtaining the data indicated by the I/O operation. If it proves to be a non-recoverable error, the data of that sector is re-computed by the storage operating system using RAID techniques from the contents of the remaining disks of the array and then written again to disk.

Most disks provide a pool of spare sectors for use in dealing with media errors. The spares pool is a set of entries of one or more contiguous sectors in length on the disk drive. The size of the spares pool varies, but is generally proportional to the overall size of the disk and is deemed sufficient to accommodate the expected sector failures during the drive's normal life expectancy. In one example, the spares pool may be between 2,000-10,000 entries long.

When a faulty sector is encountered, a command is issued to reassign the sector, i.e., to change the assigned on-disk storage location for the data from the faulty sector to a new sector selected from the spares pool. As a result, the faulty sector is no longer used, its contents (data) are written to the new sector, and references to it are mapped to the new sector. Faulty sectors that have been reassigned are typically enumerated in a defect list that resides on the disk and is associated with the spares pool. Note that requests to add sectors to the defect list are typically made by the storage operating system. In general, operating systems will not reassign a slow-reading sector's data to a new sector in the spares pool as it may be considered wasteful of spares space. However, a sector with a recovered error is typically noted as such by a fully capable operating system, such as Data ONTAP. This recovered error information is, therefore, logged each time a read or write to the questionable sector is attempted. For a large-sized, high-density drive (gigabyte and terabyte-sized), or array of such drives, this constant (and ever-increasing) logging of information can reduce the efficiency of the storage operating system.

As the size of disk drives grows ever higher and densities within disk media become greater, the frequency of recovered errors increases as well. Moreover, these errors eventually often become unrecoverable errors if not addressed promptly. And even if they remain recoverable, they greatly increase storage operating system overhead associated with error recovery mechanisms and logging, as described above.

SUMMARY OF THE INVENTION

This invention overcomes the disadvantages of the prior art by providing a system and method for reducing unrecoverable errors in a disk drive, or other similar storage media, by undertaking an aggressive reassignment of slow-reading or currently recoverable-buterroneous sectors to the spares pool. A recovered error is treated by the system operating system as a fatal error and thereby the sectors encountering the error are reassigned to the spares pool immediately so that its data can be stored at a new, stable storage location. Reassignment is recommended by a reassignment utility at the disk interface level, which passes a status up to the storage layer (a RAID subsystem in an illustrative embodiment) by which reassignment is performed. In order to prevent a double-disk panic, the RAID subsystem is instructed to ignore reassignment recommendations of this type (e.g. reassignment of recoverable errors) if the RAID group is currently operating in a degraded state. However, if the RAID group is undegraded, then immediate assignment of the recoverable error is undertaken. In this manner the system and method according to this invention facilitates reassignment/retiring of each and every sector involved immediately upon occurrence of each and every recoverable error signal (SCSI 01) or non-recoverable error signal (SCSI 03) signal except where a panic might ensue.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
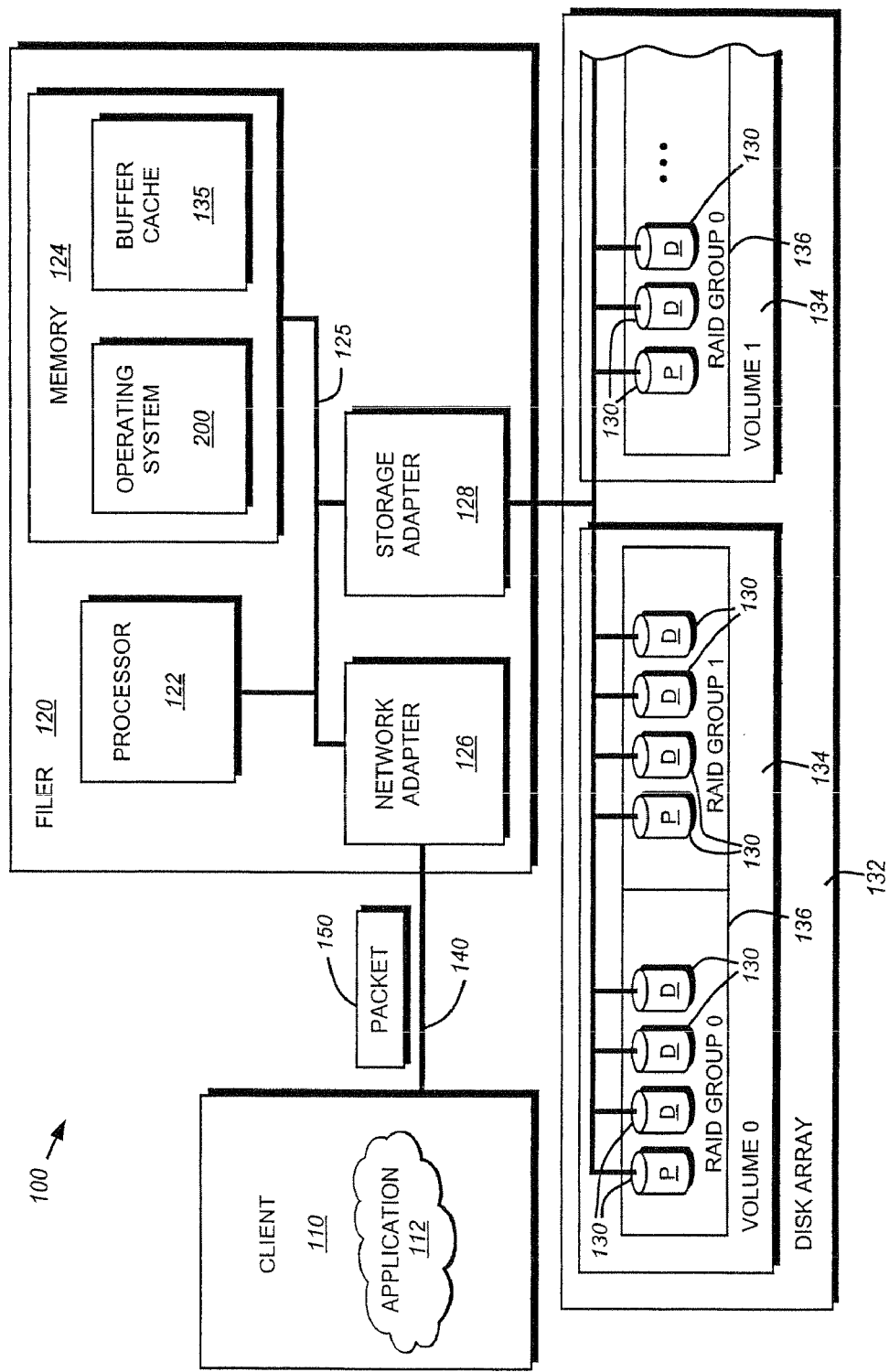
FIG. 1 is a schematic block diagram of a network environment including a file server and disk array that may be advantageously used with the present invention.

FIG. 1 is a schematic block diagram of an environment 100 that includes a client 110 having one or more applications 112, and interconnected file server 120 that may be advantageously used with the present invention. The file server or "filer" 120 is a special-purpose computer that provides file service relating to the organization of information on storage devices, such as disks 130. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In a preferred embodiment, the disk array 132 is arranged as a plurality of separate volumes (Volume 0, Volume 1, etc.), each having a file system associated therewith, as described further. The volumes each include one or more RAID groups 136 of disks 130 denoted generally RAID Group 0, RAID Group 1, etc. In a typical implementation, the RAID groups 136 each include independent physical disks 130 including those storing striped data (D) and those storing separate parity (P) for the data, in accordance with the preferred embodiment that employs a RAID 4 configuration. However, other configurations (e.g. RAID 5 having distributed parity across stripes) are also contemplated. In this embodiment, a minimum of one parity disk and one data disk is employed. However, a typical implementation may include three data disks and one parity disk per RAID group and a multiplicity of RAID groups per volume, as shown.

To facilitate access to the disks 130 on the array 132, the operating system 200 implements a write-anywhere file system that logically organizes the information as a hierarchical structure of directories and files on the disks. Each "on-disk" file may be implemented as a set of disk sectors configured to store information, such as data, whereas the directory may be implemented as a specially formatted file in which other files and directories are stored. As noted above, in the illustrative embodiment described herein, the operating system is preferably the NetApp® Data ONTAP™ operating system available from Network Appliance, Inc., Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that manages data access and, in the case of filers, may implement file system semantics (such as the above-referenced WAFL). In this sense, ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The organization of the preferred storage operating system for the exemplary filer is now described briefly. However, it is expressly contemplated that the principles of this invention can be implemented using a variety of alternate storage operating system architectures.

Figure 2:
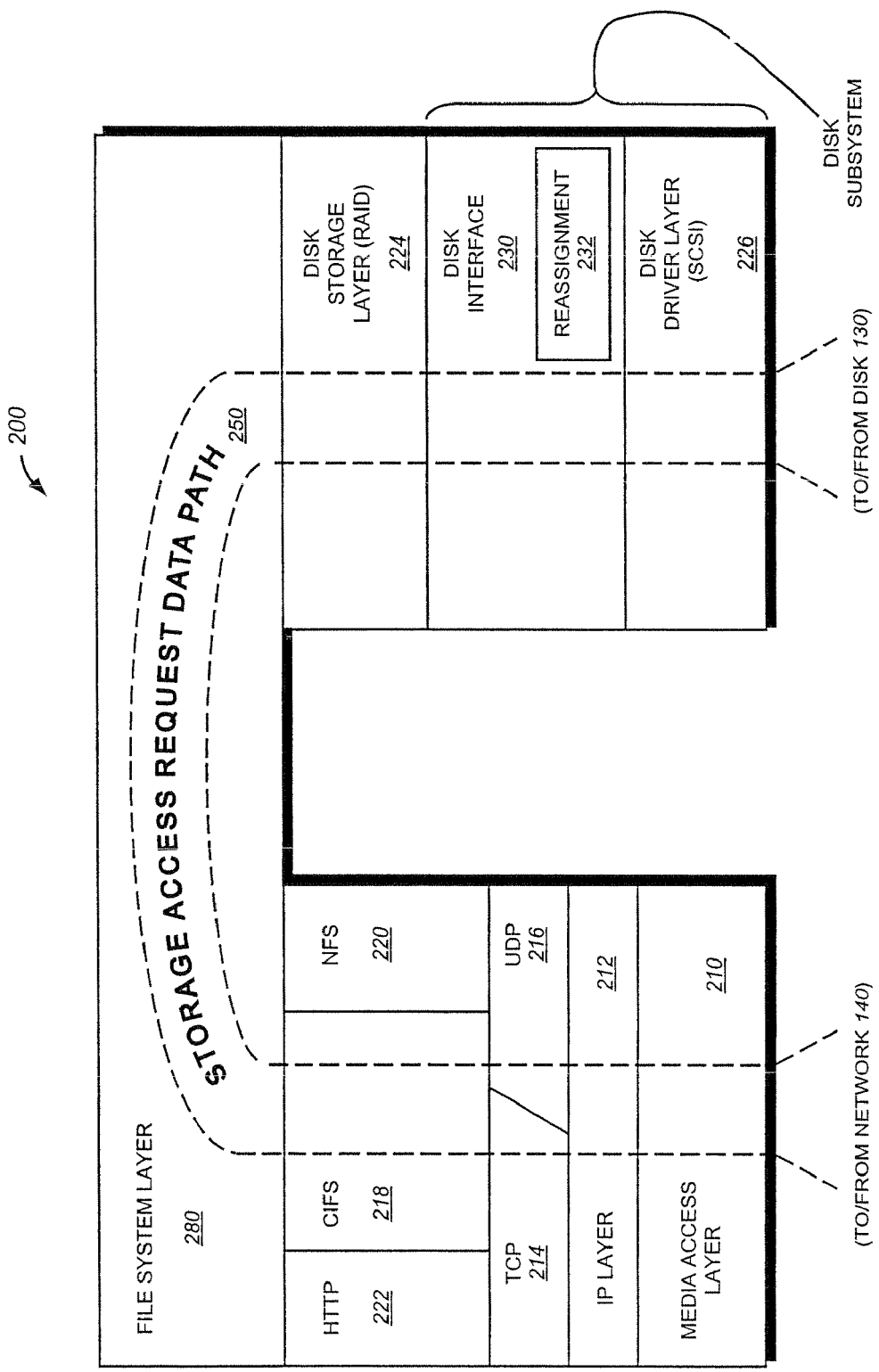
FIG. 2 is a schematic block diagram of an operating system file system layer that may be advantageously used in connection with the file server of FIG. 1.

As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, and a disk subsystem that includes a disk interface 230 and a disk driver layer 226 that implements a disk access protocol such as, e.g., a Small Computer Systems Interface (SCSI) protocol.

Bridging the disk software layers with the network and file system protocol layers is a file system layer 280 of the storage operating system 200. Generally, the layer 280 implements a file system having an on-disk format representation that is block-based using, e.g., 4-kilobyte (KB) data blocks and using modes to describe the files. In response to transaction requests, the file system generates operations to load (retrieve) the requested data from volumes 134 if it is not resident "in-core", i.e., in the filer's memory 124. If the information is not in memory, the file system layer 280 indexes into the mode file using the mode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation can, for some applications, the performance of the file service provided by filer 120 in response to a file system request packet 150 issued by client 110.

Notably, between the disk storage layer (RAID) 224 and the disk driver layer (SCSI) resides a disk interface 230 that includes a reassignment utility 232 responsible for the reassignment of recovered error blocks according to this invention.

It will be understood to those skilled in the art that the inventive technique described herein may apply to any type of special-purpose (e.g., server) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

Figure 3:
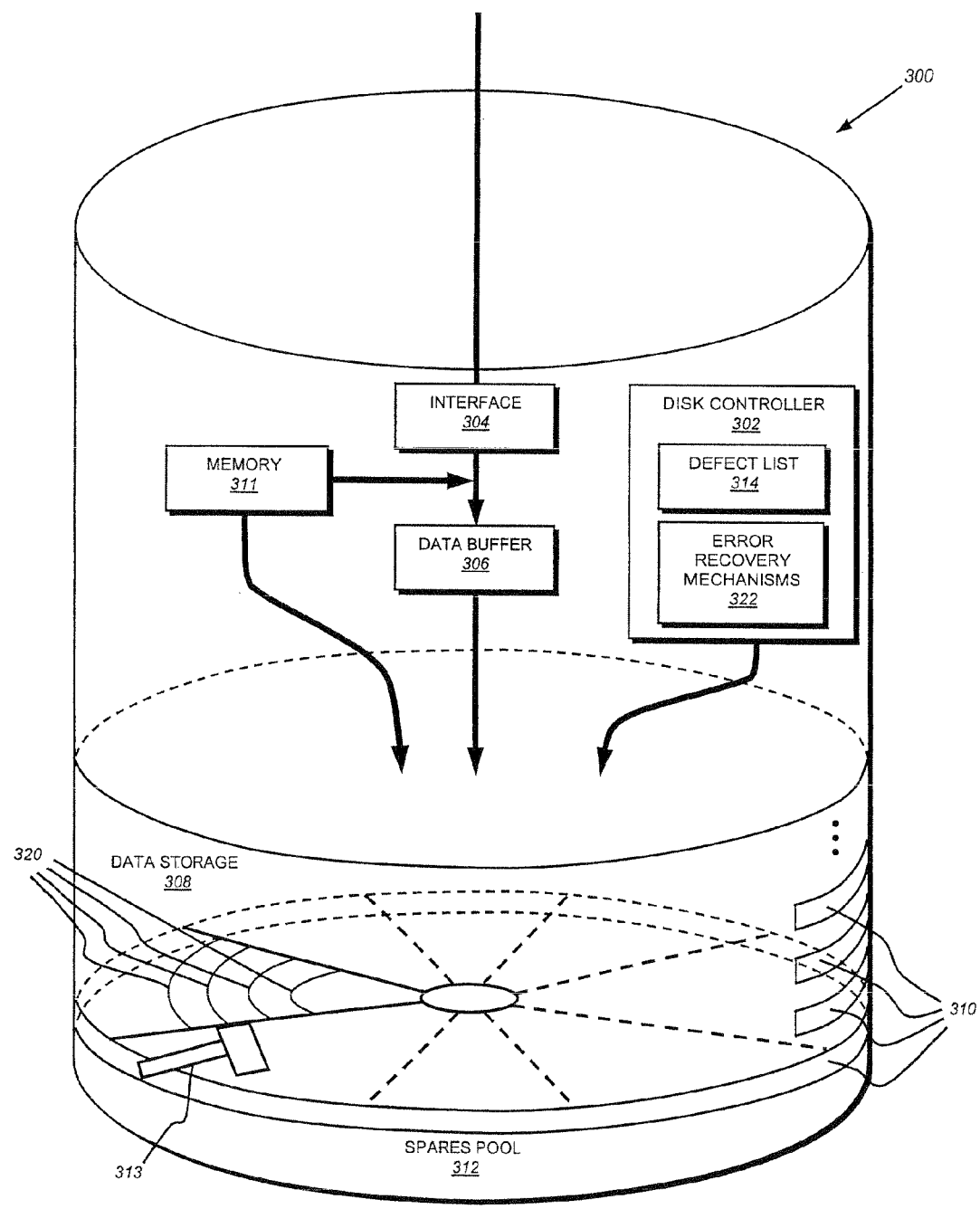
FIG. 3; is a schematic representation of a disk drive including a spares pool for reassignment of erroneous sectors according to this invention.

FIG. 3 depicts an embodiment of a disk drive 300 in accordance with the invention—wherein each of the disk drives 130 of FIG. 1 can be implemented as shown for exemplary drive 300. While differing types and arrangements of disk drives can be used in accordance with the teachings of this invention, the depicted disk drive 300 is a conventional disk drive that may be advantageously employed with the present invention and is somewhat intelligent, having an on-board disk controller 302, a drive interface 304 (such as an IDE (ATA) interface), a data buffer 306, and magnetic data storage 308 implemented as a stack of spinning platters 310 on each of which data may be written or read by means of a respective read/write head 312. The surfaces of the platters define a number of sectors 320, each containing 512 bytes (½ KB) or 520 bytes of information, depending on the type of drive. The physical sectors 320 define a number of concentric circular tracks (e.g. concentric arcs) around the platter. The disk controller 302 controls the read/write heads 313 and platters 310 in performing disk access operations, and contains logic (e.g., microcode) for implementing error recovery mechanisms 322 when media errors are encountered. In addition, volatile and nonvolatile memory 311 are provided for storing various control information as well as disk firmware. The individual procedures used by the internal disk error recovery mechanisms are well known to those skilled in the art and are not themselves part of this invention.

Media errors could be discovered during manufacturer's testing, normal 110 operations, or scrubbing operations as described above. If media errors are discovered during manufacturer's testing, the sectors involved may be remapped by the disk drive's on-board controller 302 and not later observable by the filer 120 (FIG. 1).

Figure 4:
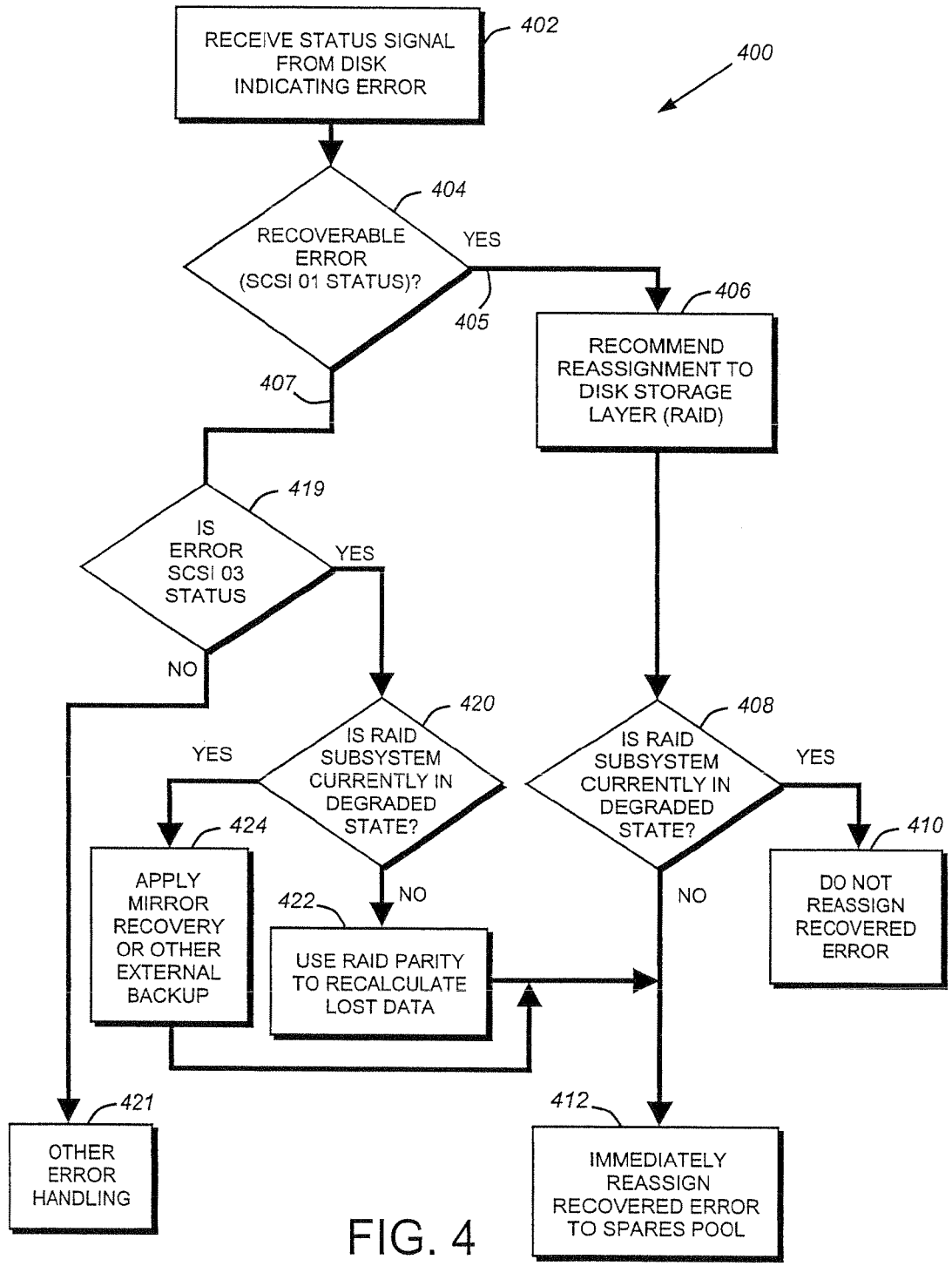
FIG. 4 is a flow diagram of an erroneous sector reassignment procedure according to an illustrative embodiment of this invention.

Before continuing with a description of the figures, it would prove helpful to discuss aspects of the SCSI protocol relevant to the invention. SCSI disk drives generate and export signals conforming to the SCSI protocol, including error-reporting signals (sometimes referred to as sense signals), that contain predefined sense key information in prescribed fields. These include SCSI sense key 01 (or "SCSI 01") representing recovered data, where the last command completed successfully with some level of data recovery action performed by the drive's internal error recovery mechanisms; and SCSI sense key 03 (or "SCSI 03") representing media error, i.e., where the last command terminated with a non-recovered error condition that was probably caused by a flaw in the medium or an error in the recorded data, or for which the drive is unable to distinguish between a medium flaw and a specific hardware failure as would be indicated by a different sense key, in either case the on-disk error recovery mechanisms was unable to recover the data. The system can obtain details of the condition indicated by either of those sense keys by examining additional sense bytes and its information field, such as sense codes. For example, for SCSI 01, sense code 17 is indicative of a recoverable drive error without use of ECC, and sense code 18 is indicative of a recoverable drive error with ECC. As noted above, recoverable errors generally do not cause data loss while non-recoverable media errors are associated with data loss, unless external (to the disk) mechanisms can recover the data. According to the invention, a system and method for reducing unrecoverable disk errors through aggressive reassignment policies will now be described in detail. Renewed reference is now made to FIG. 3 and also to FIG. 4, which details a procedure 400 governing the aggressive reassignment of sectors encountering recoverable errors (in addition to reassignment of those encountering non-recoverable errors, as described above), according to an illustrative embodiment of this invention.

During an I/O operation, the disk 300 may encounter an error as depicted by the receipt of a status signal in step 402. In the case of a recoverable media error, the disk will accordingly issue a SCSI 01 signal. (Note again, a recoverable error is a disk access error that can be recovered using the internal error recovery mechanisms 322 of the disk, as described generally above). The SCSI 01 signal is received, via the storage adapter 128 (FIG. 1), by the disk driver layer 226

(FIG. 2) of the storage operating system 200 (FIG. 2), which responsively passes a status message corresponding to the SCSI 01 signal to the disk interface 230 (FIG. 2).

The interface 230 and associated reassignment utility 232 then passes up a status message to the storage layer (RAID) 224. In accordance with decision step 404, a recoverable error leads the reassignment utility to make a recommendation to the storage layer (RAID) for reassignment of the sectors encountering the recovered error (the "faulty sectors") to the spares pool 312 (step 406). As noted above, this entails the placement of an appropriate entry of the faulty sectors onto a defect list 314 that maps to the spares pool 312.

In general, the reassignment by the interface 230 is only a recommendation of reassignment. That is, if a RAID group is currently in a degraded state, then the forced reassignment of the sectors encountering a recovered error (at that time) could result in an undesirable double-disk failure panic state that could interrupt normal operation. Note that it is typical that only the RAID subsystem knows if the group is degraded, so this decision is left with the RAID layer. Thus in accordance with decision step 408, if the RAID subsystem is in a degraded state, then it ignores the recommendation and does not attempt to reassign the sectors encountering a recovered error (step 410). Rather the RAID subsystem continues to operate with the media error in place in the disk storage space 302—relying on internal error recovery mechanisms 322 to recover the error during subsequent I/O operations if necessary. Although, according to an alternate embodiment, a bookkeeping procedure may allow tracking of the error for future reassignment of is the sectors involved, the illustrative embodiment contemplates no tracking of errors, which are reassigned later if they are reencountered during an undegraded state.

If the RAID group is not in degraded mode, then in accordance with the decision block 408, the RAID subsystem acts upon the status received from the reassignment utility and it treats the recommendation as an indicator of a fatal error. The RAID subsystem, thus, immediately reassigns the sectors encountering a recovered error to the spares pool (step 412).

The foregoing describes the treatment of faulty sectors that give rise to a recovered media error (see procedure branch 405 from decision step 404). It should be noted that faulty sectors that give rise to non-recoverable media errors (procedure branch 407 from decision step 404) would likewise be treated aggressively. Thus, during an I/O operation, when the disk encounters a non-recoverable media error, it will typically issue a SCSI 03 signal. The SCSI 03 signal is received, via the storage adapter 128 (FIG. 1), by the disk driver layer 226 (FIG. 2) of the storage operating system 200 (FIG. 2), which responsively passes a status message corresponding to the SCSI 03 signal to the disk interface 230 (see step 402). The interface 230 and associated reassignment utility 232 (FIG. 2) then passes up a status message to the storage layer (RAID) 224. Note, if the error is not recoverable, but is also not characterized as a SCSI 03 non-recoverable error, then decision step 419 branches to perform other appropriate error handling functions, if any.

Assuming the error is non-recoverable and characterized by SCSI 03 status, then the procedure determines whether the subsystem is degraded (decision step 420). If the subsystem is not degraded, then RAID reconstructs the data sought by the I/O operation that gave rise to the SCSI 03 signal from RAID parity (step 422). If, however, the subsystem is degraded, then the storage operating system may employ other external (to the drive) methods such as mirror restoration (step 424). Hence, the interface 230 will also cause reassignment of the faulty sectors 310 encountering the non-recovered error to the spares pool 312 (step 412). As noted above, this entails the placement of an appropriate entry of the faulty sectors onto a defect list 314 that maps to the spares pool 312. Accordingly, it should be apparent that the invention completes that reassignment task for each and every non-recovered media error and most non-recoverable errors (the exceptions being those that would result in a double disk failure panic—with the above steps being taken to avoid such a panic, while still maintaining a policy of aggressive reassignment all relevant errors). In other words, this invention generally provides for the reassignment/retiring of each and every sector involved immediately upon occurrence of each and every recoverable error signal (SCSI 01) or non-recoverable error signal (SCSI 03) signal except where a panic might ensue.

The use of an aggressive reassignment approach, as described above, advantageously prevents escalation of recovered errors into unrecoverable errors. The tradeoff in that the spares pool may become depleted (and the defect list "full") more quickly has been found to be reasonable because many recovered errors will, indeed, eventually become more serious errors and the use of the spares pool as a "fuel gauge" that meters disk life in a meaningful way is desirable. In other words, when the spares pool becomes sufficiently depleted that the system administrator begins to receive standard alarms/alerts about availability of spares space, then it is a good indicator that a disk is approaching its failure point, and should be replaced. Delaying this time by holding recovered errors only serves to slow disk operation while logging of events by the storage operating system occurs.

Note that the above-described SCSI error signals are conventional and that drives conforming to standards other than SCSI can also be employed providing that they produce signals that differentiate between recoverable and non-recoverable errors. As such signals that exhibit status states somewhat like the SCSI 01 and SCSI 03 status states are provided by the alternate standard.

The foregoing has been a detailed description of the invention. Various modification and additions can be made without departing from the spirit and scope of this invention. For example, the logging of reassignment recommendations can be kept by various layers of the operating system so as to allow subsequent reassignment of recovered errors once the RAID group in question is no longer in a degraded state. The use of a RAID-type organization for the storage media is exemplary and the principles herein may be applicable to other types of fault-tolerant storage and to other types of storage media such is as electro-optical. Furthermore, it is expressly contemplated that the processes shown and described according to this invention can be implemented as software, consisting of a computer-readable medium including program instructions executing on a computer, as hardware or firmware using state machines and the like, or as a combination of hardware, software, and firmware. Accordingly, this description is meant to be taken only by way of example and not to otherwise limit the scope of this invention.

What is claimed is:

1. A method for operating a computer data storage system, comprising:
    recognizing a recoverable error in a data storage device of the data storage system in response to receiving a command for a write operation;
    determining whether the data storage system is in a degraded state;
    reassigning the write operation encountering the recoverable error to a space on a spare data storage device if the data storage system is not in a degraded state; and storing the write operation for reassignment to the spare data storage device at a future time if the data storage system is in a degraded state.

2. The method as in claim 1, further comprising:
using a direct access storage device (DASD) as the data storage device.

3. The method as in claim 1, further comprising:
using a magnetic data storage disk as the data storage device.

4. The method as in claim 1, further comprising:
using a RAID system of magnetic storage disks as the data storage device.

5. The method as in claim 1, further comprising:
using an optical storage device as the data storage device.

6. The method as in claim 1, further comprising:
using a solid state device as the data storage device.

7. The method as in claim 1, further comprising:
using a logical unit number (lun) in a storage device as the data storage device.

8. The method as in claim 1, further comprising:
using a sector of a physical data storage device which can be divided into sectors as the data storage device.

9. A computer data storage system apparatus, comprising:
a processor to recognize a recoverable error in a data storage device in response to receiving a command for a write operation,
an operating system executable by the processor to determine whether the data storage system is in a degraded state,
the operating system to reassign the write operation encountering the recoverable error to a space on a spare data storage device if the data storage system is not in a degraded state, and to store the write operation for reassignment to the spare data storage device at a future time if the data storage system is in a degraded state.

10. The apparatus as in claim 9, further comprising:
a direct access storage device (DASD) used as the data storage device.

11. The apparatus as in claim 9, further comprising:
a magnetic data storage disk used as the data storage device.

12. The apparatus as in claim 9, further comprising:
a RAID system of magnetic storage disks used as the data storage device.

13. The apparatus as in claim 9, further comprising:
an optical storage device used as the data storage device.

14. The apparatus as in claim 9, further comprising:
a solid state device used as the data storage device.

15. The apparatus as in claim 9, further comprising:
a logical unit number (lun) in a storage device used as the data storage device.

16. The apparatus as in claim 9, further comprising:
a sector of a physical data storage device which can be divided into sectors is used as the data storage device.

17. A computer readable storage media, comprising:
said computer readable storage media containing program instructions for execution on a processor for a method of operating a computer data storage system, the program instructions for,
recognizing a recoverable error in a data storage device in response to receiving a command for a write operation;
determining whether the data storage system is in a degraded states; and
reassigning the write operation encountering the recoverable error to a space on a spare data storage device if the data storage system is not in a degraded state; and
storing the write operation for reassignment to the spare data storage device at a future time if the data storage system is in a degraded state.

18. A method for operating a computer data storage system, comprising:
recognizing a recoverable error in a data storage device in response to receiving a command for a write operation;
determining whether the data storage system is in a degraded states;
executing a reassignment utility to reassign the write operation encountering the recoverable error to a space on a spare data storage device if the data storage system is not in a degraded state; and
storing the write operation for reassignment to the spare data storage device at a future time if the data storage system is in a degraded state.

19. A computer data storage system, comprising:
an operating system executing on a processor of the data storage system to recognize a recoverable error in a data storage device in response to receiving a command for a write operation;
the operating system to determine whether the data storage system is in a degraded states;
the operating system to execute a reassignment utility to reassign the write operation encountering the recoverable error to a space on a spare data storage device if the data storage system is not in a degraded state; and
the operating system to store the write operation for reassignment to the spare data storage device at a future time if the data storage system is in a degraded state.

* * * * *

UNITED STATES PATENT AND TRADEMARK OFFICE
CERTIFICATE OF CORRECTION

PATENT NO.        : 7,984,328 B1
APPLICATION NO.   : 12/641568
DATED             : July 19, 2011
INVENTOR(S)       : Douglas W. Coatney Page 1 of 1

It is certified that error appears in the above-identified patent and that said Letters Patent is hereby corrected as shown below:

In Col. 2, line 41 should read:
parity protection. ~~Minoring~~ Mirroring is an expensive solution in terms In Col. 3, line 8 should read:
remaining disks of an array following the failure of a ~~is~~ single In Col. 3, line 13 should read:
would have to recover the data from a ~~minor~~ mirror or backup, if In Col. 7, line 11 should read:
using ~~modes~~ inodes to describe the files. In response to transaction In Col. 7, line 16 should read:
the ~~mode~~ inode file using the ~~mode~~ inode number to access an appropriate In Col. 8, line 19 should read:
Testing, normal ~~110~~ I/O operations, or scrubbing operations as Signed and Sealed this
First Day of May, 2012

David J. Kappos
*Director of the United States Patent and Trademark Office*